United States Patent [19]

Enomoto et al.

[11] 4,238,434

[45] Dec. 9, 1980

[54] METHOD OF PRODUCING A SILICON CARBIDE SINTERED BODY

[75] Inventors: Ryo Enomoto; Hiroyuki Tanaka, both of Ohgaki; Kazuhisa Hara, Ichinomiya, all of Japan

[73] Assignee: Ibigawa Electric Industry Co., Ltd., Ohgaki, Japan

[21] Appl. No.: 8,851

[22] Filed: Feb. 2, 1979

[30] Foreign Application Priority Data

Feb. 16, 1978 [JP] Japan .................................. 53/15883
Apr. 10, 1978 [JP] Japan .................................. 53/41330
Nov. 1, 1978 [JP] Japan ................................ 53/133758

[51] Int. Cl.$^3$ ...................... C01B 31/36; C04B 35/56
[52] U.S. Cl. ........................................ 264/63; 264/65; 264/344; 423/345; 106/44
[58] Field of Search .......................... 423/345; 106/44; 264/63, 65, 344

[56] References Cited

U.S. PATENT DOCUMENTS

| | | | |
|---|---|---|---|
| 3,271,109 | 9/1966 | Mezey et al. ........................ | 423/345 |
| 4,004,934 | 1/1977 | Prochazka .......................... | 264/65 X |
| 4,123,286 | 10/1978 | Coppola et al. ................. | 423/345 X |

FOREIGN PATENT DOCUMENTS 1283813 11/1968 Fed. Rep. of Germany ........... 423/345

*Primary Examiner*—Jack Cooper
*Attorney, Agent, or Firm*—Stevens, Davis, Miller & Mosher

[57] ABSTRACT

A method of producing a silicon carbide sintered body is disclosed. The sintered body having a density of at least 2.4 g/cm$^3$ is produced by preparing a mixture consisting mainly of silicon carbide with an average particle size of not more than 3.0 microns and a temporary binder, shaping the mixture into a green body and sintering the green body at a temperature of 1,750° C.–2,100° C. Before the sintering, silicon carbide is contacted with either hydrofluoric acid or anhydrous hydrofluoric acid and an atmosphere is held in a non-oxidizing state after the contact treatment up to the completion of the sintering.

20 Claims, 8 Drawing Figures

FIG_1
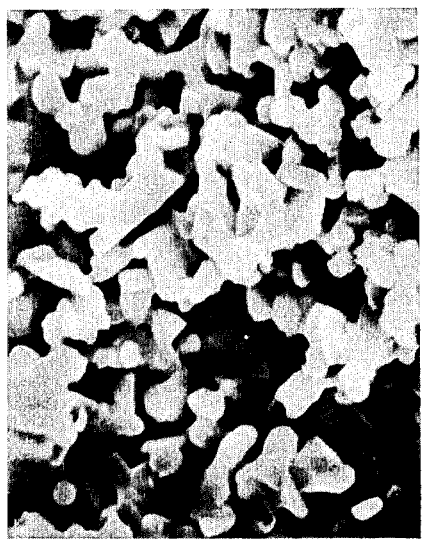
FIG_2
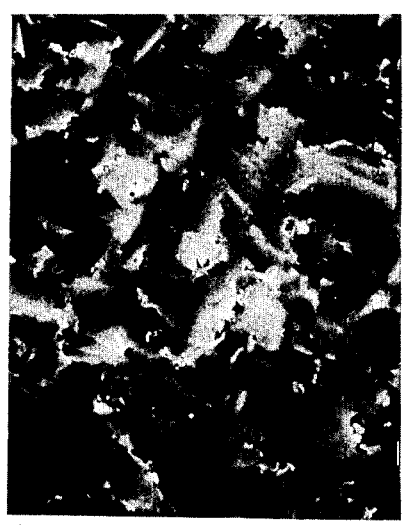
FIG_3
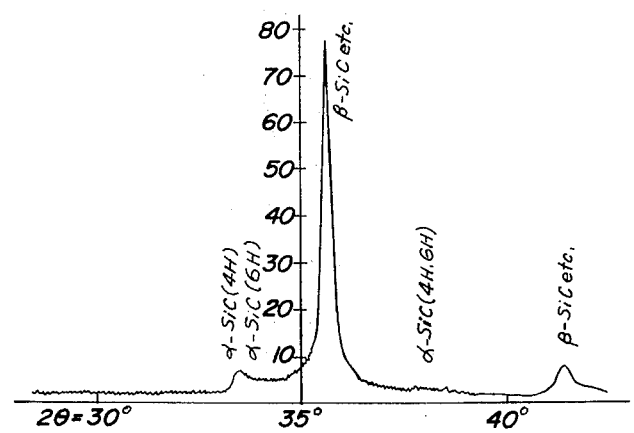

FIG_4
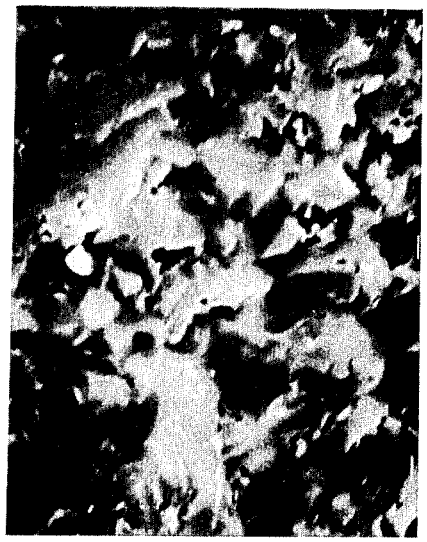
FIG_5
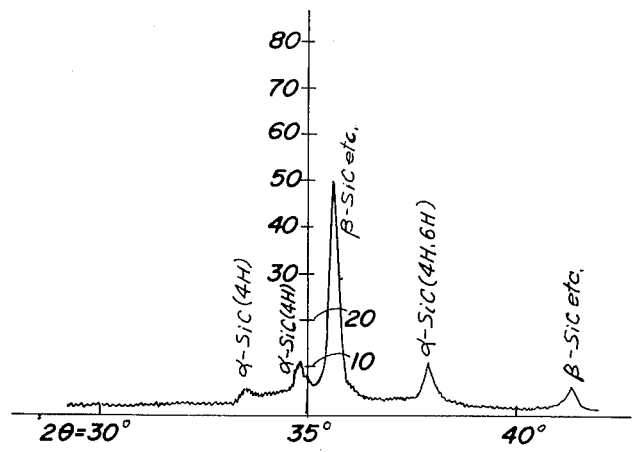

METHOD OF PRODUCING A SILICON CARBIDE SINTERED BODY

The present invention relates to a method of producing a high density silicon carbide sintered body.

Silicon carbide is very excellent in chemical and physical properties such as thermal conductivity, thermal expansion coefficient, high temperature strength, thermal shock resistance, oxidation resistance, corrosion resistance and the like, and is a material suitable for high temperature structural applications such as components for gas turbines, ordinary engine parts, chemical processing equipments and so on.

Heretofore, there have mainly been adopted a hot pressing process, which is reported by Alliegro et al in *Journal of the American Ceramic Society*, Vol. 39, No. 11, pages 386-389 and disclosed by Prochazka et al in U.S. Pat. No. 3,954,483, and a reaction sintering process as disclosed by Forrest in U.S. Pat. No. 3,459,939 in order to produce a high density silicon carbide sintered body. In the hot pressing process, it is easy to obtain a sintered body with a high density and a desired size, but it is very difficult to produce a sintered body of a complicated form and also the productivity is low. In the reaction sintering process, products of complicated form can be produced, but the heat strength rapidly decreases at elevated temperatures above 1,350° C. and also the product may contain a great amount of free silicon exhibiting a harmful action.

Since silicon carbide is a hardly sinterable material, it has hitherto been considered that it is very difficult to apply a process generally used in the production of other ceramics, wherein an article shaped at room temperature is sintered without pressing, to the sintering of silicon carbide. However, there has recently been proposed a process of sintering silicon carbide without pressing by Prochazka in U.S. Pat. No. 4,004,934, wherein a submicron powder mixture of $\beta$-silicon carbide, boron-containing compound and carbonaceous additive is shaped into a green body and then the green body is sintered at a temperature of 1,900°-2,100° C. in an inert atmosphere. Furthermore, the use of silicon carbide having a surface area of 1-100 m$^2$/g in the above pressureless sintering process has been disclosed by Coppola et al in German Patent laid open No. 2,624,641. Moreover, an improvement of the pressureless sintering process has been disclosed by Prochazka in U.S. Pat. No. 4,041,117, wherein a submicron powder mixture of $\beta$-silicon carbide having an average particle size of not more than 0.45 micron and small amounts of $\beta$-silicon carbide, boron additive and carbonaceous additive is shaped into a green body and then the green body is sintered at a temperature of about 1,950°-2,300° C. in an inert atmosphere.

In any case of the aforementioned pressureless sintering processes, the carbonaceous additive is mainly added for reducing a silica film, which protects a surface of a silicon carbide particle even at room temperature, with carbon at an elevated temperature to enhance the sinterability of silicon carbide. However, the amount of carbon added is as small as 0.1-5.0% by weight based on the amount of silicon carbide, while the particle size of silicon carbide is less than 1.0 micron and the surface area thereof is enormous, so that even if it is intended to use as the carbonaceous additive a solution of a carbonaceous organic material capable of forming free carbon by thermal decomposition, the overall surface of the silicon carbide particles can not uniformly be covered with such carbonaceous additive. As a result, the silica film is partly removed by the reduction reaction, so that the remaining silica film obstructs the growth of silicon carbide grains at the sintering stage to deteriorate the sinterability thereof or adversely exerts upon the properties of the resulting sintered body as an inclusion.

Namely, according to the pressureless sintering process of the prior art, there are required the high temperature sintering of about 2,050° C. and the use of expensive and ultrafine powder of silicon carbide. Further, it is very difficult to obtain a silicon carbide sintered body wherein silicon particles are completely self-bonded with each other because the inclusion composed of silica is unevenly distributed in the sintered body.

It is, therefore, an object of the present invention to provide a novel pressureless sintering process which solves and eliminates the aforementioned drawbacks of the prior art.

According to the present invention, there is provided a method of producing a silicon carbide sintered body comprising the steps of:
(a) preparing a mixture consisting mainly of silicon carbide having an average particle size of not more than 3 microns and 0.5-10.0 parts by weight as a solid content of a temporary binder based on 100 parts by weight of silicon carbide,
(b) shaping the mixture into a green body, and
(c) sintering the green body at a temperature of 1,750° C.-2,100° C. to produce a sintered body having a density of at least 2.4 g/cm$^3$;
said silicon carbide being contacted with either hydrofluoric acid or anhydrous hydrofluoric acid at latest before the step (c) and an atmosphere being held in a non-oxidizing state after the contact treatment up to the completion of the sintering.

The present invention will now be described in greater detail below.

According to the present invention, silicon carbide as a starting material should have an average particle size of not more than 3 microns. If the average particle size of silicon carbide exceeds 3 microns, it is difficult to produce a sintered body having a density of at least about 2.4 g/cm$^3$ and a uniform crystal grain size. In order to obtain a high density and high strength sintered body, the use of silicon carbide having an average particle size of not more than 1.0 micron is particularly preferable.

As silicon carbide to be used in the present invention, there can be used either $\beta$-type crystal belonging to cubic system or $\beta$-type crystal belonging to hexagonal system or both. The production of silicon carbide as the starting material can be carried out by any of conventionally known processes. For instance, there are known a process wherein metallic silicon or silica powder is reacted with fine powder of carbon under heating, a process wherein a mixed gas of, for example, silicon halide and hydrocarbon is reacted in vapor phase, a process of finaly pulverizing and sieving particles of $\alpha$-type silicon carbide obtained by an Acheson method in industry, a process of continuously producing $\beta$-type silicon carbide starting from silica and carbon as previously proposed by the inventors in Japanese Patent laid open No. 142,697/77 and the like. In any case, silicon carbide may contain free carbon, free silica or free silicon which is apt to deteriorate the sinterability and cause the defect in the sintered body, so that it is desirable to remove these harmful substances as far as possible by the conventional manner.

According to the present invention, it is essential that silicon carbide is contacted with either hydrofluoric acid or anhydrous hydrofluoric acid at latest before the sintering. The reason why silicon carbide is contacted with hydrofluoric acid or anhydrous hydrofluoric acid is as follows. That is, the surface of the silicon carbide particle is always covered with a silica film at room temperature in air, so that the silica film is removed with the aforementioned acid to exposure the silicon carbide particles themselves and enhance the sinterability thereof. The mechanism of removing the silica film with hydrofluoric acid or anhydrous hydrofluoric acid is expressed by the following reaction formula (1):

$$SiO_2 + 4HF \rightarrow SiF_4 + 2H_2O \ldots \quad (1)$$

The silicon carbide particles after the removal of silica film are apt to be easily oxidized and are again covered with the silica film by the oxidation with oxygen in air according to the following reaction formula (2):

$$2SiC + 3O_2 \rightarrow 2SiO_2 + 2CO \ldots \quad (2)$$

For this reason, according to the present invention, it is necessary to maintain the silicon carbide particles in a non-oxidizing atmosphere after the removal of silica film up to the completion of the sintering. As a result, high density sintered bodies can be obtained by the firmly self-sintering of silicon carbide particles without again covering the surface of the silicon carbide particles with the silica film.

Heretofore, free silica frequently existent in silicon carbide powder has been removed by temporarily immersing the powder in hydrofluoric acid or a mixed solution of hydrofluoric acid and nitric acid, washing with water and drying, but the surface of silicon carbide powder is still covered with the silica film even after the above treatment, because the silica film temporarily removed by contacting with hydrofluoric acid according to the formula (1) is again formed by exposuring to air or reacting with oxygen dissolved in water at the washing step. Accordingly, the treatment of silicon carbide with hydrofluoric acid or anhydrous hydrofluoric acid according to the present invention as mentioned above is entirely different from the purification of silicon carbide, wherein free silica is removed from the silicon carbide powder with hydrofluoric acid, as disclosed in the prior art in the object, construction and effect.

The inventors have confirmed from various experiments that when the green body, which is composed of fine powder of silicon carbide after the removal of free silica with hydrofluoric acid and does not contain a solid reducing agent such as carbon, is sintered at an elevated temperature of 2,100° C. in an inert atmosphere at atmospheric pressure, remarkable grain growth is not observed and only a low density sintered body is obtained. Furthermore, it has been confirmed that the green body made from a homogeneous dispersion of submicron powder of silicon carbide, 0.5-2.5 parts by weight as carbon content of a carbonaceous organic compound and 0.3-3.0 parts by weight of boron carbide as disclosed in U.S. Pat. No. 4,004,934 requires a sintering temperature of about 100° C.-150° C. higher than that of the present invention in order to produce a sintered body having substantially the same density level as that of the present invention. From there facts, it is considered that the requirement of higher sintering temperature and tendency of making the microstructure of the sintered body ununiform in the conventionally known pressureless sintering process are due to the fact that the silica film obstructing the self-sintering of silicon carbide and adversely exerting upon the properties of the sintered body is partly removed.

According to the present invention, when the silica film is removed with either hydrofluoric acid or anhydrous hydrofluoric acid, there is another merit as follows. That is, when the solid reducing agent such as carbon is added in an excessive amount according to the prior art, it is incorporated into the sintered body, which causes the degradation of properties of the sintered body. On the contrary, hydrofluoric acid or anhydrous hydrofluoric acid used in the present invention does not adversely affect the properties of the sintered body even when adding as a liquid form in an excessive addition amount because anhydrous hydrofluoric acid has a boiling point of about 19° C. and easily vaporizes, while hydrofluoric acid is evaporated by heating. Moreover, according to the prior art the oxygen content in silicon carbide as the starting material must strictly be controlled so as to enhance the sinterability, but such a control is substantially difficult. On the other hand, according to the present invention, the starting material is treated with either hydrofluoric acid or anhydrous hydrofluoric acid prior to the sintering, so that the severe oxygen control as described above is not necessary.

Hydrofluoric acid or anhydrous hydrofluoric acid to be used in the present invention can uniformly remove the silica film from the surface of the silicon carbide particle even in a relatively small amount owing to gaseous or liquid substance, but it is usually used in an amount corresponding to at least 0.2 part by weight of hydrogen fluoride based on 100 parts by weight of silicon carbide. When hydrofluoric acid or anhydrous hydrofluoric acid is used in an amount of less than 0.2 part by weight, the silica film can not sufficiently be removed from the surface of the silicon carbide particle, so that it is very difficult to obtain the satisfactory sinterability and produce a sintered body having a high density and a uniform crystal state.

According to the present invention, anhydrous hydrofluoric acid is preferably used rather than hydrofluoric acid. That is, the use of anhydrous hydrofluoric acid has merits that the silica film can uniformly be removed and that the step is more simplified when the green body is contacted with a gas of anhydrous hydrofluoric acid.

If desired, a non-oxidizing mineral acid may be used together with hydrofluoric acid or anhydrous hydrofluoric acid in order to remove impurities other than silica contained in the silicon carbide powder.

Furthermore, according to the present invention it is essential that silicon carbide is mixed with a temporary binder and shaped into a green body in order to produce a high density sintered body. The temporary binder to be used in the present invention is a substance capable of temporarily developing an adhesion between the particles of silicon carbide at an initial sintering stage for forming a bonding neck between the particles of silicon carbide but giving no effect on the self-sintering of silicon carbide particles.

For instance, when the green body treated with hydrofluoric acid or anhydrous hydrofluoric acid and containing not temporary binder is used to produce a sintered body, a remarkable grain growth is observed as shown in FIG. 1, but it is difficult to obtain a high density sintered body because the sintering shrinkage is hardly caused as a whole and the sintered body becomes porous. On the other hand, when the green body containing a temporary binder is sintered under the same conditions as described above, the sintering shrinkage is wholly caused together with the grain growth to produce a high density sintered body as shown in FIG. 2.

In the conventional pressureless sintering process using carbon as a reducing agent, a sintered body whole shrunk in sintering is obtained without using the temporary binder, so that the use of the temporary binder is usually unnecessary. Because, it is considered that the silica film covering the surface of the silicon carbide particle locally remains without subjecting to a reduction reaction with carbon at the initial sintering stage and acts as a viscous bonding agent for silicon carbide.

From the above, it is apparent that the absence of the temporary binder produces portions having no bonding neck in the sintered body so that the grain growth is partly caused and the whole sintering shrinkage is hardly caused.

Furthermore, the temporary binder has a function of increasing the strength of the green body after drying.

According to the present invention, the mixture contains 0.5–10.0 parts by weight as a solid content of the temporary binder based on 100 parts by weight of silicon carbide. When the amount of the temporary binder is smaller than 0.5 part by weight, the function of the temporary binder is not fully developed and it is difficult to produce a high density sintered body, while when the amount exceeds 10.0 parts by weight, the temporary binder obstructs the sintering action as an inclusion and deteriorates the properties of the sintered body. Therefore, the amount of the temporary binder should be within a range of 0.5–10.0 parts by weight and is preferably within a range of 1.0–7.0 parts by weight.

As the temporary binder, use may be made of inorgaic substances such as sodium silicate, colloidal silica, alumina sol, aluminum phosphate and the like or organic substances such as polyvinyl alcohol, corn starch, molasses, coal tar pitch, phenolic resin, lignin sulfonate, alginates and the like. When the inorganic substance is used as the temporary binder, it is apt to be attacked by hydrofluoric acid or anhydrous hydrofluoric acid, so that it is preferable that the inorganic substance is added after silicon carbide is contacted with hydrofluoric acid or anhydrous hydrofluoric acid. On the other hand, the organic substance is hardly attached by hydrofluoric acid or anhydrous hydrofluoric acid, so that it can advantageously be used without restricting its addition time. Furthermore, the organic substance is soluble in water or an organic solvent, so that it can be uniformly dispersed as a solution in water or the organic solvent.

The mixture consisting mainly of silicon carbide and the temporary binder according to the present invention is prepared by adding and mixing silicon carbide with a solution of the temporary binder in water or an organic solvent or by adding a powdery temporary binder to silicon carbide and kneading it with water or an organic solvent. In this case, the temporary binder may be added to silicon carbide before or after silicon carbide is contacted with hydrofluoric acid or anhydrous hydrofluoric acid. If the temporary binder is used as a solution, it becomes a solid at the drying step before the sintering.

In addition to silicon carbide and the temporary binder, the mixture according to the present invention may contain not more than 5.0 parts by weight of a sintering aid. The addition of the sintering aid is to further promote the sintering force by dispersing it into the silicon carbide particles so as to increase lattice defects in the sintering at an elevated temperature. The reason why the amount of the sintering aid added is limited to not more than 5.0 parts by weight is due to the fact that when the amount exceeds 5.0 parts by weight, the oxidation resistance and high temperature strength of the resulting sintered body lower considerably.

As the sintering aid, use may be made of elements such as boron, aluminum, iron, tungsten, magnesium and the like or compounds thereof. Among them, the use of a boron containing substance such as boron or boron carbide is preferable because it does not deteriorate much the oxidation resistance of the sintered body as compared with the other sintering aid. If the boron containing substance is used as the sintering aid, it is preferable that the substance having an average particle size of not more than 1 micron is used in an amount equivalent to not more than 3.0 parts by weight of elemental boron. When the amount of the boron containing substance exceeds 3.0 parts by weight, the addition effect of this substance is unchanged.

Moreover, it is advantageous that the sintering aid is added to and uniformly mixed with silicon carbide before the addition of the temporary binder. Under many circumstances, silicon carbide contains trace amounts of impurities such as aluminum, boron and the like as solid solution, which also act as the sintering aid, but the presence of these impurities does not obstruct the present invention.

According to the present invention, the mixture consisting mainly of silicon carbide and the temporary binder is shaped into a green body having a desired form and a size deduced from a sintering shrinkage. In the formation of the green body, a dried mixture of silicon carbide and temporary binder is throughly mixed to uniformly disperse them before the shaping or a wet mixture containing silicon carbide and temporary binder is dried after the shaping. In the former case, the temporary binder is uniformly dispersed in a powdery state, so that the function of the temporary binder is fully developed owing to its softening and fusing at temperature rising step of the sintering. In the latter case, the temporary binder may migrate into the green body during the drying, so that it is desirable to take a long drying time as far as possible or to uniformly dry the green body from its interior.

The formation of the green body with any form can be carried out by any one of conventionally known shaping processes, for example, by compression molding, extrusion molding, injection molding, cast molding or hydrostatic pressure molding. In the compression molding, a pressure of about 250–2,000 kg/cm$^2$ is usually used, so that the density of the green body is about 1.6–1.9 g/cm$^3$. In order to produce a high density sintered body, it is preferable to increase the density of the green body as far as possible. For this end, a small amount of a lubricant such as stearates may be added to the mixture before the shaping. The hydrostatic pressure molding is particularly useful for shaping a green body having a complicated form and a high density because it may be carried out by charging the mixture into, for example, a rubber container and reducing a pressure inside the container.

According to the present invention, it is an essential feature that the treatment of silicon carbide with hydrofluoric acid or anhydrous hydrofluoric acid as mentioned above should be carried out before or after the preparation of the mixture or after the shaping of the green body.

When using anhydrous hydrofluoric acid according to the present invention, it can be used in any form of gas or liquid owing to the boiling point of about 19° C. The gaseous anhydrous hydrofluoric acid is usually used at a temperature near room temperature, but can be used at a temperature below 700° C. When silicon carbide or the mixture consisting mainly of silicon carbide and temporary binder is contacted with anhydrous hydrofluoric acid, the interior of the container filled with silicon carbide or the mixture is maintained in an atmosphere of gaseous anhydrous hydrofluoric acid or a mixed gas atmosphere of gaseous anhydrous hydrofluoric acid and a non-oxidizing gas, or silicon carbide or the mixture may be immersed in or kneaded with a liquid of anhydrous hydrofluoric acid. Further, when the green body is contacted with anhydrous hydrofluoric acid, the treatment with gaseous anhydrous hydrofluoric acid as described above is conducted or the green body may be impregnated with the liquid of anhydrous hydrofluoric acid.

In order to uniformly diffuse anhydrous hydrofluoric acid into the silicon carbide powder, the mixture or the green body, it is preferable that gaseous anhydrous hydrofluoric acid is charged into a container or a gas stream of anhydrous hydrofluoric acid passes through the container after a pressure inside the container is reduced to remove air contained in the silicon carbide powder or the mixture or the green body. In this case, it is advantageous to thoroughly dry silicon carbide or the mixture or the green body prior to the treatment with anhydrous hydrofluoric acid. Particularly, the treatment of the green body with gaseous anhydrous hydrofluoric acid is simple in the operation and is most preferable.

The liquid of anhydrous hydrofluoric acid after the above treatment can easily be removed by heating to a temperature above 19° C., which is a boiling point of anhydrous hydrofluoric acid, or reducing the pressure. When the step after contacted with anhydrous hydrofluoric acid is carried out in air, the surface of the silicon carbide particle is again covered with silica film by oxidation, so that such step must be maintained in a non-oxidizing atmosphere.

When using hydrofluoric acid according to the present invention, the substantially same manner as described on the case of using the liquid of anhydrous hydrofluoric acid can be repeated. For example, silicon carbide or the mixture is added and uniformly kneaded with hydrofluoric acid, or is dipped in hydrofluoric acid. In case of the green body, hydrofluoric acid is uniformly sprayed on the surface of the green body, or a surface of the green body is dipped in hydrofluoric acid. Particularly, the kneading of silicon carbide or the mixture with hydrofluoric acid is advantageous because the silica film can uniformly be removed. In any case, silicon carbide or the mixture or the green body contacting with hydrofluoric acid can be handled in air. Then, it is dried, for example, by heating to a temperature above about 115° C., which is a boiling point of hydrofluoric acid, in a stream of a non-oxidizing gas or under a reduced pressure, whereby water content, intermediate product or excessive amount of hydrogen fluoride is removed. This drying step must be maintained in a non-oxidizing atmosphere, otherwise the surface of silicon carbide is again covered with silica film by oxidation in air.

The removal of hydrofluoric acid or anhydrous hydrofluoric acid can be carried out in a lidded container made of, for example, a fluorine-contained resin and having an inlet and an outlet or a suction port for the non-oxidizing gas, in a chamber of a non-oxidizing atmosphere such as globe box or the like, or directly in a sintering furnace of a non-oxidizing atmosphere.

As apparent from the above, according to the present invention it is essential that an atmosphere is held in a non-oxidizing state after the treatment with hydrofluoric acid or anhydrous hydrofluoric acid up to the completion of the sintering. As the non-oxidizing atmosphere, use may be made of at least one gas atmosphere selected from argon, helium, neon, nitrogen, hydrogen, carbon monoxide and gaseous anhydrous hydrofluoric acid or a vacuum. In case of using hydrofluoric acid, steam is generated together with hydrogen fluoride in a course of the drying, but the presence of steam does not obstruct the present invention because it is coexistent in hydrogen fluoride. Carbon dioxide causes the oxidation of silicon carbide due to the decomposition in the sintering, so that the use of carbon dioxide gas should be avoided as far as possible.

According to the present invention, it is frequently required to transfer silicon carbide or the mixture or the green body contacted with hydrofluoric acid or anhydrous hydrofluoric acid from a chamber of a non-oxidizing atmosphere such as a globe box to another chamber or from the chamber to a sintering furnace without exposing to air. For this purpose, silicon carbide or the mixture or the green body is placed in a container under a non-oxidizing atmosphere and then the container is sealed. As the container, use may be made of bags or vessels made of rubber, vinyl resin, plastics, metal, glass or ceramics. Particularly, when the container is placed in the sintering furnace, it is advantageous to use a bag or vessel capable of sintering together with the green body such as rubber bag, vinyl bag or plastic vessel, or a ceramic vessel made of graphite withstanding at an elevated temperature of about 2,000° C.

Moreover, it is preferable that the green body is directly charged into a sintering furnace, contacted with gaseous anhydrous hydrofluoric acid and thereafter sintered in a non-oxidizing atmosphere as it is. In this case, it is omitted to transfer the green body after the treatment with anhydrous hydrofluoric acid from a chamber of a non-oxidizing atmosphere such as a globe box to the sintering furnace without exposing to air as mentioned above, so that the operation becomes more simple.

According to the present invention, the green body is sintered at a temperature of 1,750° C.–2,100° C. in a non-oxidizing atmosphere to produce a sintered body having a density of at least 2.4 g/cm$^3$. When the sintering temperature is lower than 1,750° C., the growth of crystal grain is insufficient and it is difficult to obtain the sintered body having a density of not less than 2.4 g/cm$^3$. While, when the temperature is higher than 2,100° C., the sintered body becomes denser, but the coarsening of crystal grain is caused to deteriorate the properties such as mechanical strength of the sintered body. Therefore, the sintering temperature should be within a range of 1,750° C.–2,100° C. In order to obtain a sintered body having a high density of more than 2.9 g/cm$^3$ required for giving an excellent mechanical strength and a uniform and fine microstructure, it is most preferable to sinter the green body at a temperature of 1,800° C.–2,000° C.

The inventors have confirmed from various experiments that the green body according to the present invention can be sintered at a temperature of about 100° C.–150° C. lower than that of the green body using carbon as a reducing agent in the prior art if it is intended to produce a sintered body having substantially the same density level. That is, the present invention has such a merit that the green body can be sintered at a relatively low temperature as compared with the green body of the prior art. Further, a phenomenon of causing weight reduction of silicon carbide at a temperature above about 1,950° C. can be avoided according to the present invention. Moreover, according to the prior art, when β-type silicon carbide powder is used as a starting material, the transformation of β-type crystal to β-type crystal promotes in the sintering, so that the resulting sintered body is apt to have a crystal structure having coarse and slender plated crystals adversely exerting upon the mechanical properites. On the contrary, according to the present invention, even if β-type silicon carbide powder is used, a high density sintered body having a uniform and fine microstructure can be obtained without transforming to α-type crystal.

The time required for sintering at a temperature of 1,750° C.–2,100° C. mainly depends upon the microstructure and density of the desirable sintered body. Generally, when the green body is sintered at a relatively low sintering temperature for a period of at least 10 minutes, a sintered body having a uniform and fine microstructure can be obtained easily. Further, when the temperature is gradually raised within a range of about 1,500° C.–1,700° C. at the temperature rising step of the sintering, the bonding neck is sufficiently formed between the silicon carbide particles, so that such a gradual temperature rising is advantageous for producing a high density sintered body.

As the sintering furnace, use may be made of various high-temperature sintering furnaces capable of controlling the sintering temperature and atmosphere. For instance, there may be used a conventionally known sintering furnace provided with a furnace core tube made of graphite and a heating element.

In order to produce a sintered body having a complicated form or a further accurate size, according to the present invention, the green body may be first presintered in a non-oxidizing atmosphere and then finally sintered in the same atmosphere after the presintered body is worked into a desired shape. Such a two-step sintering is well-known, for example, from U.S. Pat. No. 3,998,646. The presintering is to diminish the dimensional change of the green body due to the sintering shrinkage in the final sintering as far as possible so as to enhance the dimensional accuracy of the sintered body and to give a strength suitable for green machining to the green body and it is preferable to effect the presintering at a temperature of 1,550° C.–1,800° C. When the presintering temperature is lower than 1,550° C., the sintering shrinkage is very small and the strength suitable for green machining can not be obtained, while when the temperature is higher than 1,800° C., the sintering rapidly proceeds and the resulting sintered body becomes hard, so that it is difficult to work the sintered body by means of a machine.

According to the present invention, the green body presintered in a non-oxidizing atmosphere can also be worked by means of a machine in air. In this case, silicon carbide particles constituting the green body are again covered with the silica film. Therefore, it is preferable that after the green body is worked into a desirable shape, the shaped body is again contacted with hydrofluoric acid or anhydrous hydrofluoric acid and then subjected to final sintering at a temperature of 1,750° C.–2,100° C. in a non-oxidizing atmosphere. The treatment of the shaped body with hydrofluoric acid or anhydrous hydrofluoric acid can be carried out in the same manner as described on the case of treating the green body with hydrofluoric acid or anhydrous hydrofluoric acid.

The present invention will now be described in greater detail with reference to the accompanying drawings, wherein:

FIG. 1 is a scanning-type electron photomicrograph (5,000× magnification) of a sintered body using no temporary binder as described in Comprative Example 1;

FIG. 2 is a scanning-type electron photomicrograph (5,000× magnification) of a sintered body obtained sintering at a temperature of 1,900° C. as described in Example 2;

FIG. 3 is an X-ray diffraction pattern of β-type silicon carbide powder used in Example 1;

FIG. 4 is a scanning-type electron photomicrograph (5,000× magnification) of a sintered body obtained by sintering at a temperature of 1,850° C. as described in Example 2;

FIG. 5 is an X-ray diffraction pattern of powder of the sintered body of FIG. 4;

Figure 6:
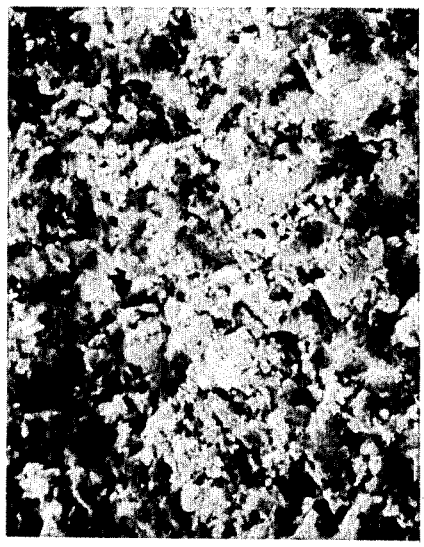
FIG. 6 is a scanning-type electron photomicrograph (5,000× magnification) of a sintered body obtained by sintering at a temperature of 1,850° C. as described in Comparative Example 2.

The present invention will be described more clearly by means of the following examples and comprative examples.

EXAMPLE 1

As a starting material, there was used β-type silicon carbide powder having chemical composition and particle size as shown in the following Table 1 and a crystal structure shown in FIG. 3, which is produced by a continuous process for the production of β-type silicon carbide as disclosed in Japanese Patent laid open No. 142,697/77, and refined and sieved.

TABLE 1

| Chemical composition (wt. %) | | | | | | |
|---|---|---|---|---|---|---|
| SiC | SiO$_2$ (free) | C (free) | Al | Fe | Mg | Ca |
| 99.40 | 0.20 | 0.15 | 0.10 | 0.05 | 0.02 | trace |

| Crystal structure (wt. % identified by X-ray diffraction) | |
|---|---|
| β-type | α-type |
| 97.0 | 3.0 |

| Particle size (micron) |
|---|

TABLE 1-continued

| Chemical composition (wt. %) | |
|---|---|
| weight average particle size | maximum particle size |
| 0.47 | 1.30 |

In an agate motrar were charged 20.00 g of the aforementioned β-type silicon carbide powder, 1.42 g of waste molasses (made by Tokai Seito Co. Ltd., solid content 71.3 wt.%), 0.20 g of magnesium stearate and 2.00 g of distilled water and then throughly kneaded for 15 minutes. This wet mixture was placed in a box-type dryer and dried by gradually heating up to 200° C. and then the dried mixture was cooled and again kneaded in an agate mortar for 15 minutes. A given amount of the mixture powder was weighed from the agate mortar and shaped in a graphite die under a pressure of 700 kg/cm$^2$ to form a disk-like green body. The green body had a diameter of 20.3 mm and a density of 1.69 g/cm$^3$ (about 53% of the theoretical density).

Then, the green body was placed in a closable graphite container of 50 ml capacity provided with gas inlet and outlet, which is housed in a globe box under an argon gas atmosphere, and the pressure inside the container was reduced through an aspirator for 30 minutes. Thereafter, anhydrous hydrofluoric acid having a purity of more than 99.0% (made by Hashimoto Kasei Kogyo Co. Ltd., water content of less than 0.5 wt.%) was introduced in a gaseous form into the container and the green body was left to stand for 30 minutes as it was. After such a procedure was repeated 3 times, the green body was left to stand in a gaseous atmosphere of anhydrous hydrofluoric acid for 24 hours.

The graphite container containing the green body was sealed in he globe box and transferred into a Tammann sintering furnace, where the sintering was effected in an argon gas atmosphere with a temperature schedule as shown in the following Table 2:

TABLE 2

| Room temperature to 600° C. | 60 minutes |
|---|---|
| 600° C. to 1,500° C. | 22 minutes |
| 1,500° C. to 1,900° C. | 80 minutes |
| 1,900° C. hold | 60 minutes |

After allowed to cool to room temperature, the resulting sintered body had a sintering shrinkage of 15.2% and a density of 2.72 g/cm$^3$ (about 85% of the theoretical density).

EXAMPLE 2

In an agate mortar were mixed 19.82 g of β-type silicon carbide powder as described in Example 1 and 0.18 g of boron carbide having an average particle size of 0.62 micron, which is obtained by pulverizing 200 mesh particles of commercially available boron carbide (made by Denki Kagaku Kogyo Co., Ltd.), for 30 minutes. To the mixed powder were added 1.34 g of waste molasses, 0.20 g of magnesium stearate and 2.00 g of distilled water and then the mixture was further mixed for 15 minutes. The thus obtained wet mixture was shaped into a green body in the same manner as described in Example 1. The green body was contacted with gaseous anhydrous hydrofluoric acid and sintered in a Tammann sintering furnace under an argon gas atmosphere with the same temperature schedule as described in Example 1. The resulting sintered body had a density of 3.09 g/cm$^3$ (about 96% of the theoretical density) and a sintering shrinkage of 18.8%.

As apparrent from the scanning-type electron photomicrograph of FIG. 2, the sintered body had a crystal structure wherein crystal grains of about 2-5 microns were firmly bonded to each other.

Moreover, the same green body was sintered in the same manner as described above except that the maximum sintering temperature is 1,850° C. and is held in 60 minutes. The resulting sintered body had a sintering shrinkage of 17.7% and a density of 2.96 g/cm$^3$ (about 92% of the theoretical density) and its crystal structure was a microstructure having a clear bonding surface of uniform crystal grain size as shown in the scanning-type electron photomicrograph of FIG. 4. Further, it had been confirmed from the X-ray diffraction pattern of FIG. 5 that there is not caused the transformation of β-type crystal to α-type crystal in the course of the sintering.

EXAMPLE 3

In an agate mortar were mixed 19.82 g of β-type silicon carbide powder as described in Example 1 and 0.18 g of boron carbide powder as described in Example 2 for 30 minutes and then 0.20 g of magnesium stearate was added as a benzene solution thereto and dried. To this mixture was added a solution of 0.30 g of a novolac-type phenolic resin in about 8 cc of acetone and the mixing was further continued for 15 minutes. The resulting wet mixture was left to stand for 30 minutes with stirring at times to remove acetone.

The dried powder mixture was placed in a closable fluorine-contained resin container of 30 ml capacity provided with gas inlet and outlet and then uniformly mixed with 3.0 g of liquid anhydrous hydrofluoric acid for 30 minutes. The wet mixture was dried by heating up to 150° C. over 2 hours in a flowing stream of an argon gas. Then, a given amount of the powder mixture was weighed out from the closable container in a glove box under an argon gas atmosphere and shaped into a disk-like green body having a diameter of 20.3 mm by means of a press mounted inside the globe box under a pressure of 700 kg/cm$^2$.

The green body was placed in a closable graphite container and transferred into a Tammann sintering furnace, where the sintering was effected in an argon gas atmosphere with the same temperature schedule as described in Example 1. The resulting sintered body had a sintering shrinkage of 18.4% and a density of 3.05 g/cm$^3$ (about 95% of the theoretical density).

COMPARATIVE EXAMPLE 1

A mixture having the same composition as described in Example 2 but containing no waste molasses as the temporary binder was prepared and then shaped into a green body in the same manner as described in Example 1. The green body was contacted with gaseous anhydrous hydrofluoric acid and sintered in a Tammann sintering furnace with the same temperature schedule as described in Example 1. The resulting sintered body had a sintering shrinkage of 8.0% and a density of 2.18 g/cm$^3$ (about 68% of the theoretical density) and a crystal structure as shown in the scanning-type electron photomicrograph of FIG. 1 wherein remarkable grain growth was observed but individual crystal grains were scattered to exhibit a porous microstructure.

The same procedure as described above was repeated by adding 4.50 g of waste molasses as the temporary binder to the mixture. In this case, the sintered body had a sintering shrinkage of 15.3% and a density of 2.74 g/cm³ (about 85% of the theoretical density). When the crystal structure of this sintered body was observed by means of a scanning-type electron microscope, it had been confirmed that a great amount of carbon is existent in grain boundaries and obstructs the growth of crystal grains.

COMPARATIVE EXAMPLE 2

A mixture having the same composition as described in Example 3, except that the amount of novolac-type phenolic resin was increased to 0.60 g, was shaped into a green body without contacting with either hydrofluoric acid or anhydrous hydrofluoric acid. Then, the green body was placed in a graphite container and charged into a Tammann sintering furnace, where the sintering was effected in an argon gas aatmosphere with the same temperature schedule as described in Example 1 except that the maximum sintering temperature of 1,850° C. was held in 60 minutes. The resulting sintered body had a density of 2.21 g/cm³ (about 69% of the theoretical density) and a crystal structure as shown in the scanning-type electron photomicrograph of FIG. 6 wherein the grain growth was very little.

Figure 7:
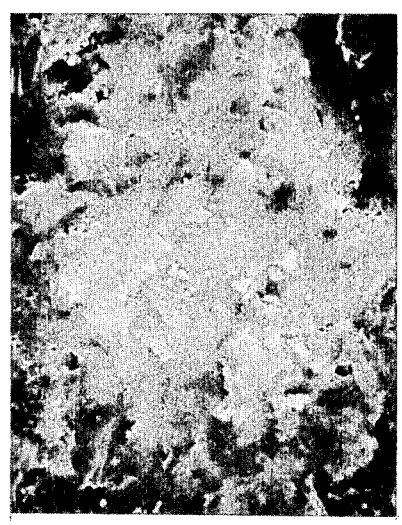
FIG. 7 is a scanning-type electron photomicrograph (5,000× magnification) of a sintered body obtained by sintering at a temperature of 2,050° C. as described in Comparative Example 2.
Figure 8:
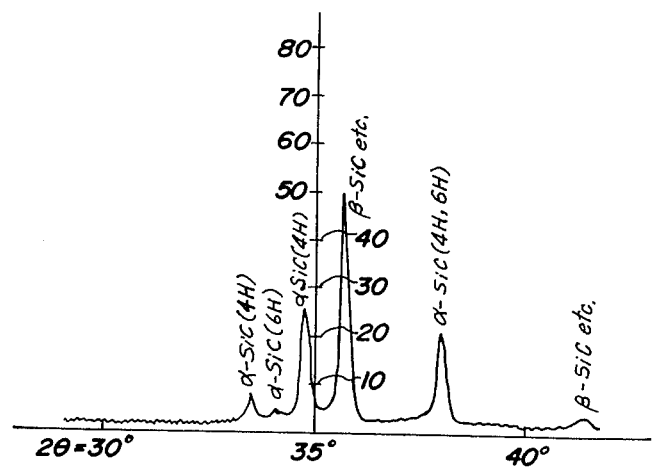
FIG. 8 is an X-ray diffraction pattern of powder of the sintered body of FIG. 7.

When the sintering of the green body was effected by raising the maximum sintering temperature to 2,050° C. and holding this temperature in 45 minutes, the resulting sintered body had a sintering shrinkage of 17.4% and a density of 3.05 g (about 95% of the theoretical density) and a microstructure composed of irregular crystal grains having no clear bonding surface as shown in the scanning-type electron photomicrograph of FIG. 7. Moreover, it had been confirmed from the X-ray diffraction pattern of this sintered body as shown in FIG. 8 that almost all of β-type silicon carbide powder used as the starting material is transformed into α-type crystal in the course of the sintering.

EXAMPLE 4

In an agate mortar were mixed 49.56 g of β-type silicon carbide powder as described in Example 1 and 0.44 g of boron carbide powder as described in Example 2 for 30 minutes. The mixed powder was placed in an opened fluorine-contained resin container and then added and kneaded with 3.00 g of ligninsulfonate (made by Sanyo Kokusaku Pulp Co. Ltd., Sanex P201), 2.00 g of hydrofluoric acid (content of hydrogen fluoride 55 wt.%) and 10.50 g of distilled water for 15 minutes. A given amount of the wet mixture was weighed and shaped into a disk-like green body having a diameter of 20.3 mm by means of a graphite die under a pressure of 700 kg/cm².

The green body was placed in a closable graphite container provided with gas inlet and outlet in a globe box under an argon gas atmosphere and then dried by heating up to 150° C. over 3 hours, while passing an argon gas through the container, to evaporate hydrofluoric acid. After the opennings of the container including the green body were sealed with an epoxy resin, the container was placed in a Tammann sintering furnace, where the sintering was effected in an argon gas atmosphere with the same temperature schedule as described in Example 1 except that the maximum sintering temperature is 1,910° C. and is held in 60 minutes. The resulting sintered body had a density of 2.97 g/cm³ (about 93% of the theoretical density).

EXAMPLE 5

In an agate mortar were mixed 29.73 g of β-type silicon carbide powder as described in Example 1 and 0.27 g of boron carbide powder as described in Example 2 for 30 minutes. The mixed powder was placed in an opened fluorine-contained resin container housed in a globe box under an argon gas atmosphere and then added with 7.50 g of hydroluoric acid (content of hydrogen fluoride 10 wt.%) and the resulting wet mixture was uniformly mixed for 30 minutes. The wet mixture was dried by heating up to 150° C. over 2 hours in a flowing stream of an argon gas. To the dried powder was added a solution of 0.90 g of novolac-type phenolic resin in about 20 ml of acetone and after acetone was removed, the mixing was further continued for 30 minutes. A given amount of the dried powder mixture was weighed and shaped into a disk-like green body having a diameter of 20.3 mm by means of a press mounted inside the globe box under a pressure of 1,500 kg/cm². The green body had a density of 1.73 g/cm³ (about 53% of the theoretical density).

The green body was placed in a closable graphite container housed in the globe box and then transferred into a Tammann sintering furnace, where the sintering was effected in an argon gas atmosphere with the same temperature schedule as described in Example 1 except that the maximum sintering temperature is 1,920° C. and is held in 60 minutes. The resulting sintered body had a density of 3.04 g/cm³ (about 95% of the theoretical density) and a sintering shrinkage of 18.1%.

EXAMPLE 6

The same procedure as described in Example 5 was repeated to prepare a dried powder mixture treated with hydrofluoric acid. To 30.00 g of the mixture were added 0.45 g of aluminum phosphate powder and about 5 ml of acetone and then the resulting wet mixture was kneaded for 30 minutes and acetone was evaporated therefrom to obtain a mixed powder. This mixed powder was shaped and sintered in the same manner as described in Example 5. The resulting sintered body had a sintering shrinkage of 16.5% and a density of 2.97 g/cm³ (about 93% of the theoretical density).

EXAMPLE 7

As a starting material, there was used α-type silicon carbide powder obtained by pulverizing, sieving and refining commercially available α-type silicon carbide powder (made by Wanami Kenmazai Kogyo Co. Ltd., #3000). This α-type silicon carbide powder had a purity of 98.5% and an average particle size of 0.59 micron. The same procedure as described in Example 5 was repeated to form a green body except that the α-type silicon carbide powder was used instead of the β-type silicon carbide powder. Then, the green body was charged into a Tammann sintering furnace under an argon gas atmosphere and then sintered with the same temperature schedule as described in Example 1 except that the maximum sintering temperature is 1,940° C. and is held in 60 minutes. The resulting sintered body had a density of 2.96 g/cm³ (about 92% of the theoretical density) and a sintering shrinkage of 16.4%.

EXAMPLE 8

As a starting material, there was used β-type silicon carbide powder with a weight average particle size of 0.25 micron and a maximum particle size of 0.62 micron obtained by the hydraulic sieving of β-type silicon carbide as described in Example 1. A wet mixture consisting mainly of this β-type silicon carbide powder and having the same composition as described in Example 4 was prepared and shaped into a disk-like green body having a diameter of 10.1 mm by means of a steel die under a pressure of 2,000 kg/cm², which was dried in the same manner as described in Example 1. The green body had a density of 1.80 g/cm³ (about 56% of the theoretical density).

The green body was sintered with the same temperature schedule as described in Example 1, except that the maximum sintering temperature is 1,880° C. and is held in 90 minutes, to obtain a sintering body having a sintering shrinkage of 16.4% and a density of 3.09 g/cm³ (about 96% of the theoretical density).

EXAMPLE 9

The same green body as described in Example 2 contacting with gaseous anhydrous hydrofluoric acid was charged into a Tammann sintering furnace and then presintered in an argon gas atmosphere at a maximum temperature of 1,680° C. for 45 minutes according to the temperature schedule described in Example 1. The resulting presintered body had a density of 2.06 g/cm³ (about 64% of the theoretical density).

The presintered body was worked into a plate body of 10 mm square by means of a diamond cutter (made by Maruto Co. Ltd., Crystal Cutter Model 202), placed in a closable graphite container housed in a globe box under an argon gas atmosphere and contacted with gaseous anhydrous hydrofluoric acid in the same manner as described in Example 1. Then, the container was sealed and transferred into a Tammann sintering furnace, where the sintering was effected in an argon gas atmosphere with the following temperature schedule:

| Room temperature to 1,680° C. | 40° C./min |
|---|---|
| 1,680° C. to 1,900° C. | 22 minutes |
| 1,900° C. hold | 60 minutes |

The resulting sintered body had a density of 3.05 g/cm³ (about 95% of the theoretical density) and a sintering shrinkage after the final sintering of 11.9%.

As previously mentioned, according to the prior art, there have been required the higher temperature sintering of about 2,050° C. and the use of ultrafine powder having a particle size of less than about 0.5 micron, which is expensive and hardly available, for pressureless sintering of silicon carbide powder. According to the present invention, however, even if silicon carbide powder of micron size is pressureless sintered at a relatively low temperature of about 1,900° C., a high density sintered body having less inclusion composed of silica film, which adversely exerts upon the properties of the sintered body, and a crystal structure of firmly bonded crystal grains can be produced. Therefore, the present invention has a great merit in industry.

What is claimed is:

1. A method of producing a silicon carbide sintered body comprising the steps of:
   (a) preparing a mixture consisting mainly of silicon carbide having an average particle size of not more than 3 microns and 0.5–10.0 parts by weight as a solid content of a temporary binder based on 100 parts by weight of silicon carbide,
   (b) shaping the mixture into a green body, and
   (c) sintering the green body at a temperature of 1,750° C.–2,100° C. to produce a sintered body having a density of at least 2.4 g/cm³;
   said silicon carbide being contacted with either hydrofluoric acid or anhydrous hydrofluoric acid at latest before the step (c) to remove silicon dioxide film contained thereon and maintained in a non-oxidizing atmosphere after the contact treatment up to the completion of the sintering to prevent formation of silicon dioxide film thereon.

2. A method as claimed in claim 1, wherein said hydrofluoric acid or anhydrous hydrofluoric acid is contacted with said silicon carbide before the preparation of the mixture at the step (a).

3. A method as claimed in claim 1, wherein said hydrofluoric acid or anhydrous hydrofluoric acid is contacted with said mixture after the step (a).

4. A method as claimed in claim 1, wherein said hydrofluoric acid or anhydrous hydrofluoric acid is contacted with said green body after the step (b).

5. A method as claimed in claim 1, wherein said hydrofluoric acid or anhydrous hydrofluoric acid is used in an amount corresponding to at least 0.2 part by weight of hydrogen fluoride based on 100 parts by weight of silicon carbide.

6. A method as claimed in claim 1, wherein said non-oxidizing atmosphere is at least one gas atmosphere selected from the group consisting of argon, helium, neon, nitrogen, hydrogen, carbon monoxide and anhydrous hydrofluoric acid or a vacuum.

7. A method as claimed in claim 1, wherein said silicon carbide, mixture or green body contacted with hydrofluoric acid or anhydrous hydrofluoric acid is placed in a container under a non-oxidizing atmosphere and the container is sealed for transfer of the contacted silicon carbide, mixture or green body from said atmosphere.

8. A method as claimed in claim 7, wherein said container is selected from the group consisting of a rubber bag, a vinyl bag, a plastic vessel, a metal vessel, a glass vessel and a ceramic vessel.

9. A method as claimed in claim 1, wherein said temporary binder is at least one substance selected from inorganic and organic substances capable of temporarily developing an adhesion between particles of silicon carbide at an initial sintering stage.

10. A method as claimed in claim 9, wherein said temporary binder is an organic substance soluble in water or an organic solvent.

11. A method as claimed in claim 1, wherein said mixture contains 1.0–7.0 parts by weight as a solid content of the temporary binder.

12. A method as claimed in claim 1, wherein said average particle size of silicon carbide is not more than 1.0 micron.

13. A method as claimed in claim 1, wherein said mixture further contains not more than 5.0 parts by weight of a sintering aid.

14. A method as claimed in claim 13, wherein said sinterig aid is at least one substance selected from the group consisting of boron, aluminum, iron, tungsten, magnesium and compounds thereof.

15. A method as claimed in claim 1, wherein said green body is sintered at a temperature of 1,800° C.–2,000° C. at the step (c).

16. A method as claimed in claim 1, wherein said sintered body has a density of at least 2.9 g/cm³.

17. A method as claimed in claim 1, wherein said green body is directly sintered without subjecting to a presintering at the step (c).

18. A method as claimed in claim 1, wherein said green body is presintered and worked into a desired shape before the step (c).

19. A method as claimed in claim 18, wherein said worked body is contacted with either hydrofluoric acid or anhydrous hydrofluoric acid.

20. A method as claimed in claim 18, wherein said presintering is effected at a temperature of 1,550° C.–1,800° C.

* * * * *